Dec. 8, 1936.   J. R. HOLMES   2,063,742
COMBINED METAL PLATE OIL FILTER AND OIL COOLER
Filed April 7, 1934   2 Sheets-Sheet 1

Inventor
John Ralph Holmes
By Blackmore, Spencer & Flint
Attorneys

Dec. 8, 1936.  J. R. HOLMES  2,063,742
COMBINED METAL PLATE OIL FILTER AND OIL COOLER
Filed April 7, 1934  2 Sheets-Sheet 2

Inventor
John Ralph Holmes

By Blackmore, Spencer & Flink
Attorneys

Patented Dec. 8, 1936

2,063,742

UNITED STATES PATENT OFFICE 2,063,742

COMBINED METAL PLATE OIL FILTER AND OIL COOLER

John Ralph Holmes, Lockport, N. Y., assignor to General Motors Corporation, Detroit, Mich., a corporation of Delaware Application April 7, 1934, Serial No. 719,610

4 Claims. (Cl. 210—191)

This invention relates to oil filters and has particular reference to a lubricant filter used on an automotive vehicle in combination with the engine water cooling system to effect the cooling of the lubricant.

The filter itself is of the metal plate type in which a stack of metal plates is enclosed in a housing, the plates being separated by a suitable spacer and the liquid caused to flow through the narrow space between the plates.

To effect an adequate cooling of the oil a number of metal plates of the filter are of increased size or diameter to cause them to project laterally from the filter plate assembly and form radiating fins. The entire outside of the filter is closed by soldering so that it is impervious to liquid and gas.

The filter is provided with a central opening and a plurality of intermediary openings between the central opening and the outside of the filter. The impure oil is caused to flow into the central opening. The oil passes through the spaces between the plates and flows to the intermediary openings and to the filter outlet, the impurities being retained at the edge of the spaces.

The housing enclosing the oil filter has an inlet port and outlet port to allow the water of the engine cooling system to flow to and around the filter and to effect a cooling of the oil.

On the drawings

Figure 1:
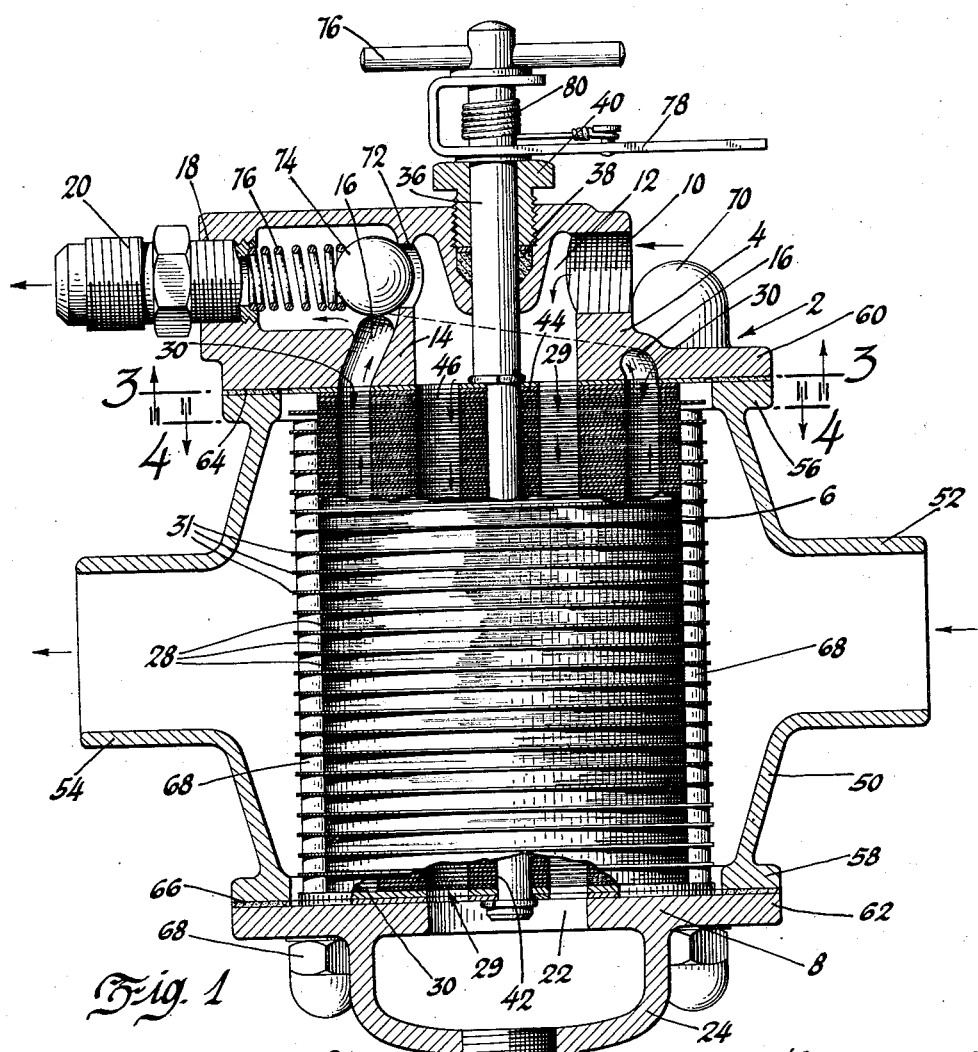
Figure 1 is a sectional view through the filter of the invention.
Figure 3:
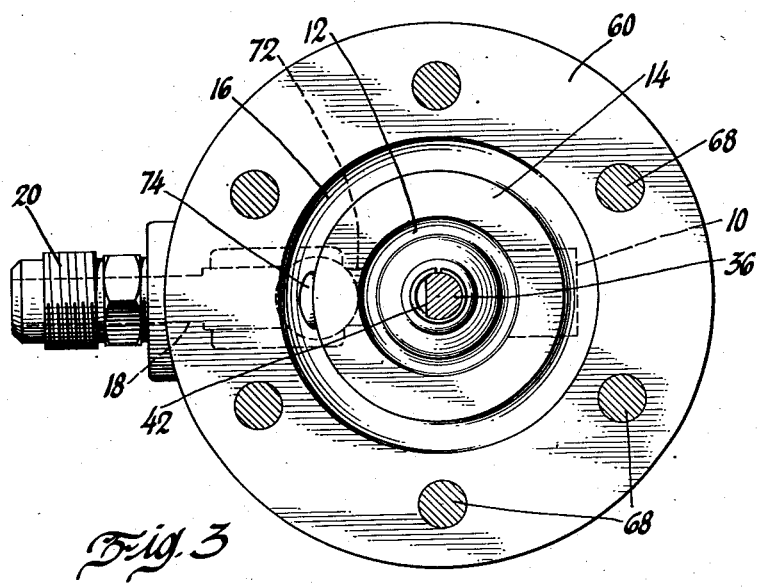
Figure 4:
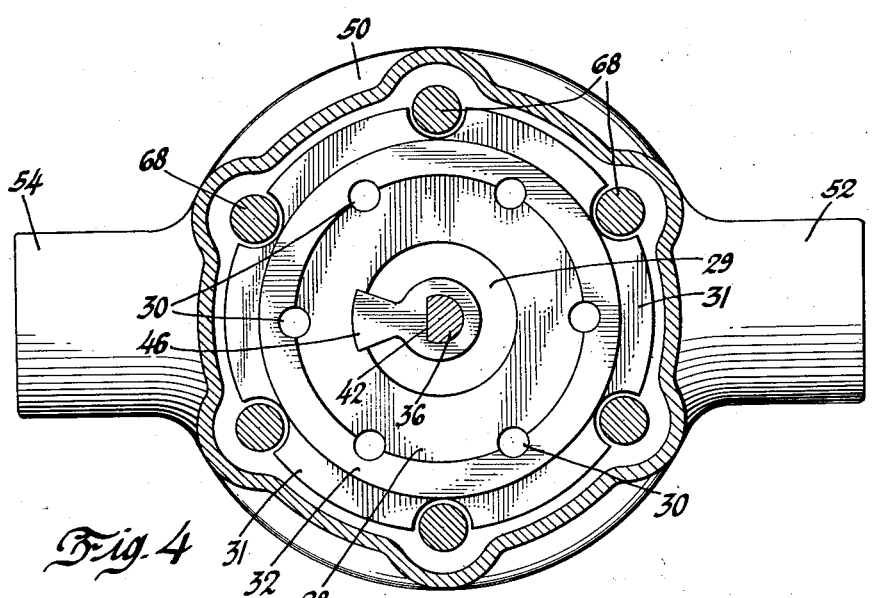

Figures 3 and 4 are views on the lines 3—3 and 4—4 of Figure 1.

Referring to the drawings, the numeral 2 indicates the filter as a whole. The filter has the head portion 4, the filter proper 6, and the bottom or base portion 8. The head portion comprises the inlet port 10 through which oil is delivered to the space 12 in the head portion 4. An annular wall 14 separates the space 12 from an oil outlet space 16 from which oil is delivered to the outlet port 18. The outlet port is shown as having a suitable nipple 20 screw threaded therein, the purpose of which is to connect to the usual oil line.

The base member 8 has the central opening 22 connecting with the chamber or sump 24 closed by the plug 26.

Figure 2:
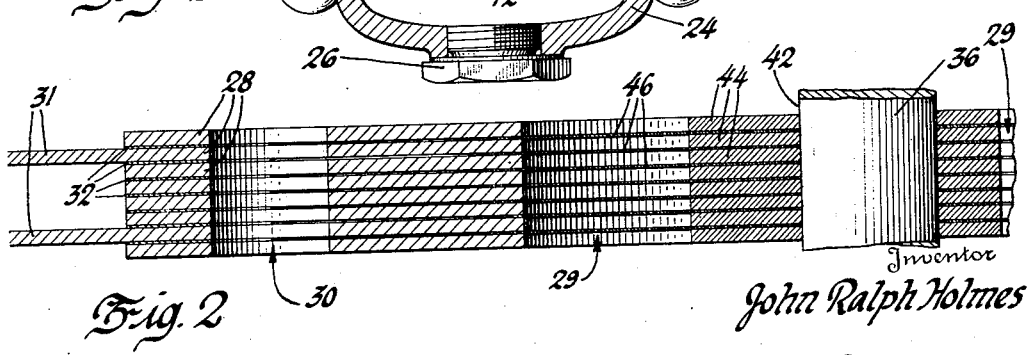
Figure 2 is an enlarged detail sectional view of the arrangement of the metal plates.

The filter proper 6 is composed of a plurality of superposed metal plates 28 best shown in Figure 2. The plates each have a central opening to form the axial passage 29, and a plurality of openings intermediate the central opening and the outside of the filter to form the intermediate passages 30. Preferably every fifth plate is considerably larger than the other plates and projects laterally of the filter to form heat radiating or dispensing fins 31. Between the adjacent plates 28, at the outer periphery thereof, spacing washers 32 are provided which slightly space the plates from each other so as to leave a very thin filtering space therebetween. If desired, instead of the spacers 32, small beads or humps on the plates may be used. When the filter plates are thus assembled, the outside of the whole is coated with any suitable sealing agent such as solder to make it impervious, both to prevent the oil from leaking out and the cooling fluid from leaking in.

A rod 36 passes centrally through the filter and is shown as mounted in liquid tight relation in the cover 4 by means of the packing 38 and the nut 40. The rod 36 has a flat side 42 best shown in Figure 3 and surrounding the flat portion is a series of washers 44 and between each pair of washers there is positioned a cleaning blade 46 the end of which projects into the space between the adjacent plates 28. There are as many cleaning blades 46 as there are filtering spaces between the plates 28. The continued use of the filter will cause the accumulation of impurities at the edges of the filter spaces inside the central opening. By rotating the rod 36, the scraper blades 46 will pass between the filtering spaces and cause a loosening of the accumulated foreign matter or impurities. After being loosened from the inside of the filter, the freed impurities will fall down the passage 29 to the sump 24 through the opening 22 and may be removed, if desired, by opening the plug 26. The opening 22 corresponds in size to the diameter of the passage 29, or may be somewhat larger.

A housing 50 surrounds the filter 6 and has a water inlet 52 and a water outlet 54. The housing 50 has a suitable top flange 56 and a bottom flange 58 which mate with a flange 60 on the head 4 and a flange 62 on the base 8. Suitable gaskets 64 and 66 are interposed and suitable bolts 68 pass through openings in the flange 62 and are screw threaded into suitable threaded recesses provided in the members 70 in the head 4. The bolts 68 and gaskets 64 and 66 hold the housing 50 in liquid tight relation with the head 4 and the base 8. By suitably connecting a pipe or hose of the water circulating system to the inlet 52 and outlet 54, the water of the engine circulating system will be caused to flow through the housing 50 and around the filter 6 to cool the plates 28 and radiating fins 31. The water passing through the housing 50 will cool the oil and maintain a better oil temperature.

A suitable connection to the lubricating system of the engine is made at the inlet 10. The oil will pass into the inlet in the direction of the arrows and down the central passage 29 in the filter, filling all of the space at the interior of the filter and surrounding the rod 36 and scraper blades 46. The pressure of the system will force the oil to pass between the narrow spaces between the plates 28 and into the passages 30 at the outer edge of the filter. The impurities in the contaminated oil being too large to pass into the spaces will be retained at the interior central passage at the edge of the filtering spaces. The purified oil, after arriving at the outer passages, will be forced upwardly to the space 16, then to the outlet passage 18, and into the conduit connected at 20 and flow to any desired point.

Referring to Figure 1, it will be noted that the wall 14 is provided with a by-pass opening 72 and a ball 74 is retained thereagainst by a coil spring 76 held at one end by the end of the nipple 20. In case the filter becomes clogged and will not allow oil to pass therethrough, the pressure of the oil will unseat the valve 74 and allow lubricant to flow through the opening 72 to the outlet nipple 20.

The cleaner blades 46 are operated by turning the handle 76 at the end of the rod 36. If desired, a lever 78 may be secured to the rod 36 and connected to the clutch or brake pedal so that every time the clutch or brake is operated the scrapers will be rotated. A spring 80 secured at its ends to the lever 78 and to the rod 36 aid in rotating the scrapers in the reverse direction when the clutch or brake pedal is released.

I claim:

1. In an oil filter, a stack comprising a plurality of superposed metal plates, a spacer between each pair of plates at the outside thereof, some of said plates being larger than the others to form heat radiating fins, means permanently closing the outside of the stack to render it impervious to liquid, said stack having a plurality of passages passing therethrough, means to conduct a liquid to be filtered to a part of said passages, said liquid traversing the space between the plates and passing to the remaining passages, means connected to the said remaining passages to lead away the filtered liquid, a housing surrounding the stack and spaced therefrom, an inlet to and an outlet from the housing, said housing adapted to allow the passage of a cooling medium to cool the filter.

2. In an oil filter, a stack comprising a plurality of superposed metal plates, a spacer between each pair of plates at the outside thereof, some of said plates being larger than the others to form heat radiating fins, means permanently closing the outside of the stack to render it impervious to liquid, said stack having an axial passage and a plurality of passages parallel to the axis, means to conduct the liquid to be filtered to said axial passage, said liquid traversing the space between the plates and passing to the said plurality of passages, means connected to said plurality of passages to lead away the filtered liquid, a housing surrounding the stack and spaced therefrom, an inlet to and an outlet from the housing, said housing adapted to allow the passage of a cooling medium to cool the filter.

3. In an oil filter, a stack comprising a plurality of superposed metal plates, a spacer between each pair of plates at the outside thereof, some of said plates being larger than the others to form heat radiating fins, means permanently closing the outside of the stack to render it impervious to fluid, said stack having a plurality of independent passages to allow the in and out flow of oil, the oil passing through the spaces between the plates in its passage through the filter, and means to conduct the oil to and from the filter.

4. In an oil filter, a stack comprising a plurality of superposed circular metal plates, a spacer between each pair of plates at the outside thereof, some of the plates being larger than the others to form heat radiating fins, said stack having a plurality of independent passages to allow the in and out flow of oil, the oil passing through the spaces between the plates in its passage through the filter, and rotatable means having fins projecting between the plates in the inlet passage whereby the rotation thereof will clean the collected material to prevent clogging.

JOHN RALPH HOLMES.